United States Patent [19]

Hearn et al.

[11] 3,961,120
[45] June 1, 1976

[54] COATING GLASS SHEETS ON BOTH SURFACES

[75] Inventors: Ralph E. Hearn; Clarence McMillen, both of Galion, Ohio

[73] Assignee: PPG Industries, Inc., Pittsburgh, Pa.

[22] Filed: Feb. 13, 1974

[21] Appl. No.: 442,285

[52] U.S. Cl. .............................. 428/210; 427/209; 427/210; 427/374; 427/376; 427/380; 428/428
[51] Int. Cl.$^2$ ..................... B32B 9/00; B32B 17/06
[58] Field of Search............ 117/68, 123 A, 124 A, 117/169 R; 427/209, 210, 374, 376, 380; 428/210, 428

[56] References Cited
UNITED STATES PATENTS

| | | | |
|---|---|---|---|
| 2,220,862 | 11/1940 | Blodgett | 117/124 |
| 2,559,969 | 7/1951 | Kennedy | 117/124 |
| 3,107,177 | 10/1963 | Saunders et al. | 117/124 |
| 3,223,549 | 12/1965 | Fredley et al. | 117/124 |
| 3,411,934 | 11/1968 | Englehart et al. | 117/69 |
| 3,418,156 | 12/1968 | Medert et al. | 117/124 |
| 3,558,346 | 1/1971 | Plumley | 117/68 |
| 3,619,240 | 11/1971 | Toussaint | 117/123 |
| R25,767 | 4/1965 | Auffenorde et al. | 117/124 |

Primary Examiner—Harry J. Gwinnell
Assistant Examiner—Sadie L. Childs
Attorney, Agent, or Firm—Edward I. Mates

[57] ABSTRACT

Coating a ceramic substrate on a second major surface while avoiding damage to a coating comprising a matured enamel frit previously applied to the first major surface. After coating one major surface with an enamel frit composition and maturing its frit component thereon, the substrate is oriented with its matured enamel frit coating facing downward and coated on its second major surface with one or more frit compositions that must be heated to an elevated temperature at which the previously matured frit coating would be prone to damage on contacting a solid member. This invention avoids such damage by supporting said matured frit on a gas bed in spaced relation to any solid member capable of demaging the enamel frit component during the portion of the heating and cooling cycle needed to mature the frit coating on the second major surface when the temperature of the substrate is elevated to a minimum temperature approaching that at which the previously matured frit would be prone to such damage. Each major surface is provided with one or more matured frit coatings which may be either superimposed on one another or in the form of discrete patterns or a combination of both.

12 Claims, 4 Drawing Figures

3,961,120

COATING GLASS SHEETS ON BOTH SURFACES

BACKGROUND OF THE INVENTION

This invention relates to coating both major surfaces of ceramic substrates which, when coated, are especially useful as microcircuits, integrated circuits, and other electrical, electroconductive, magnetic, and like components. Circuits and circuit components of the types mentioned are often fabricated by thin film application techniques. Recently, the materials used in such film circuit elements have included a wide variety of conductive, resistive, dielectric, semi-conductive, superconductive and magnetic films, as well as various substrates. The most commonly used conductive films are metals such as copper, aluminum, gold, platinum, and tantalum. Electrically resisting films include anodized tantalum, tin oxide, indium oxide, and other. Useful dielectric films include the oxides of silicon and tantalum. Semi-conductive materials such as silicon, germanium, and compound semi-conductors have been used. Tin and its alloys are under study as superconductive films. Permalloys and various special alloys are included among magnetic films.

The substrates should have properties which are compatible with the thin film materials being applied. The substrate should be capable of tolerating the process conditions required for the deposition of films, should have a high electrical resistivity, a low dielectric loss and good chemical durability. The substrate should be free of impurities which adversely affect circuit performance. The smoothness of the substrate surface is usually important. Surface irregularities must be avoided for certain applications.

A wide variety of substrate materials have been studied including glasses, ceramics, glazed ceramics, crystals, dielectric coated metals, glazed ceramics, and organic polymers.

Ceramics have special characteristics which make them an important substrate material, particularly, their high softening temperature and their low electroconductivity. However, the surface irregularities of ceramics in deviations from flatness is usually greater than that of glass. Glass and ceramics have been glazed previously on a single surface. In U.S. Pat. No. 3,223,549 to Fredley et al., for example, glass substrates are supported on their under surfaces on a gas bed to minimize thermal deformation while a coating is developed on the upward facing major surface of the glass substrate during an elevated temperature cycle. The gas bed maintains a major surface of the glass substrate out of contact with solid means that would introduce surface irregularities in the substrate on contact with said surface, particularly at the higher temperature regions of the cycle.

As the art required higher component density within a given space, it has become advantageous to glaze both sides of each substrate, thus doubling the useable area. However, applying a glaze to both sides of the substrate introduced a problem of supporting the substrate during firing of the coating material. In order to coat both surfaces, the substrate was fired while supported vertically on two parallel edges from which the coating material had been removed. Some warp resulted from the manner in which the substrate was supported in firing.

U.S. Pat. No. 3,558,346 to Plumley minimizes this warpage by supporting a substrate on one side while applying a ceramic frit to the other side. The substrate warpage is minimized because the coatings are applied to the opposite surfaces in consecutive steps. The substrate is supported on a planar refractory support during each of the two firing operations.

In accordance with the Plumley patented invention, the two glazes can be consecutively applied only if the maturing temperature of the second glaze is below the temperature at which the first glaze becomes deformed or marred. As used herein, the term "maturing temperature" refers to a temperature at which a glass frit must be held for a selected time to cause the frit particles to consolidate and form a smooth, continuous, adherent, glassy coating. Since frit compositions having lower maturing temperatures are generally less durable than frit compositions with higher maturing temperatures, the invention suggested in the Plumley patent resulted in articles having a coating of relatively low durability on one side. Furthermore, it is necessary to heat a glass substrate to a higher temperature for tempering than is needed to mature a frit, particularly one having a low maturing temperature. Therefore, the method of the Plumley patent would not be suitable to produce a tempered, frit-coated glass article.

SUMMARY OF THE INVENTION

The present invention overcomes the problems inherent in the prior art. It avoids warp by supporting the ceramic substrate in a non-vertical position. Furthermore, it avoids the need to apply an inherently low durability frit to one major surface of the substrate to be coated on both sides by a novel substrate supporting method wherein the first surface coated with a frit is first matured to elevate the temperature at which it is prone to damage, and then is oriented with its matured frit facing downward while frit is applied to the newly oriented upper surface. If the substrate is supported with its matured frit in contact with a solid means, such contact is provided only during the portion of the heating cycle needed to mature the frit on the upper surface when the substrate is within a temperature range below a temperature where the matured ceramic frit coating is subject to damage on contact with a solid means so that the matured frit coating is not spoiled or damaged while the second major surface of the substrate has its coating matured thereon.

When it is desired to impart at least a partial temper to a glass substrate on which the frit coatings are supported, it is desirable to heat the glass substrate to a temperature sufficient both to mature the frit and to impart a temper. This is a higher temperature than that which is needed to mature the frit. Hence, the frit matured onto the first surface is even more susceptible to damage when the glass substrate is to be tempered during the maturing of the frit onto the second surface than when no temper is wanted.

According to the present invention, avoidance of marring the matured frit that is susceptible to becoming damaged on contacting a solid means at an elevated temperature sufficient to fuse the frit on the upper surface of the substrate and to prepare the substrate for heat strengthening or tempering is accomplished by supporting the surface of the glass substrate with the previously matured frit contacting a gas bed during at least the portion of the thermal treatment needed to fuse the frit coating onto the upper surface of the glass when the temperature is near or above that at which the matured frit is prone to damage on contact with a solid means. The gas bed keeps the matured frit coating on the undersurface of the substrate out of contact with any solid means and preserves the smoothness of the matured frit previously disposed on the undersurface.

The provision of a gaseous bed support during the maturing of the frit onto the second surface enables one to heat a glass substrate to an elevated temperature needed for tempering during the maturing of the frit onto the second surface without harming the frit previously matured onto the first surface. Therefore, the present invention provides a method in which the substrate is heated only to a first temperature sufficient to mature the frit onto the first surface and later, to a second higher temperature to both mature the frit onto the second surface and to impart a temper to the frit-coated substrate.

When a screen printing process is used to apply more than one frit coating composition to the surface opposite that coated with the matured frit in the form of a frit dispersed in a volatile vehicle, it is advisable to apply each said composition one at a time, evaporate the volatile vehicle thereby leaving a so-called semi-permanent or dry frit coating on the upper surface of the substrate, then applying another of said compositions by screen printing and evaporating its volatile vehicle and continuing this process for as many coatings as are needed until all the frit coatings to be matured are applied onto the upper surface and dried to be semi-permanent. Then, the coatings applied to the upper surface are matured while the previously matured frit coating for the lower surface is supported out of contact with a solid means on a gas bed during at least the upper temperature range of the temperature cycle needed to mature said upper frit coatings. During the steps of applying the frit compositions to the upper surface and of evaporating their volatile vehicle or vehicles, the matured frit coated under surface of the substrate may be supported on one or more solid means provided that the temperature of the substrate is maintained below the temperature at which said matured frit is prone to said damage during the application and evaporation steps.

DETAILED DESCRIPTION OF AN ILLUSTRATIVE EMBODIMENT

Figure 1:
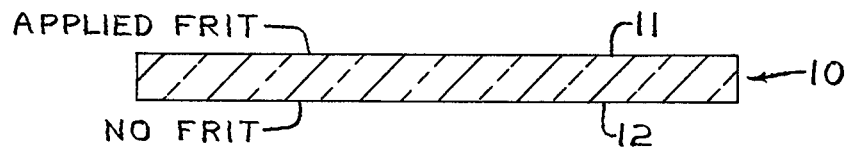
FIGS. 1 – 4 are cross-sectional views of a substrate taken during successive steps of a coating operation performed according to the teaching of the present invention with captions included to facilitate their understanding.

The present invention will be better understood in the light of a description of an illustrative embodiment used to fabricate so-called touch panels or windows for electric ovens. Each such window comprises a front surface coated with spaced electroconductive areas of tin oxide and three patterns, each of a different colored glass frit, on the surface containing the areas of tin oxide coating. In addition, the rear surface of the window contains several patterns of colored glass frit, on which an opaque coating of aluminum oxide is superimposed and a conductive circuit of ceramic silver applied in a circuit pattern bearing a desired relation to the pattern of tin oxide conductive areas on the front surface.

The conductive areas of tin oxide on the front surface are capacitively coupled to the ceramic silver circuit on the rear surface according to a predetermined arrangement, so that when an individual touches a preselected combination of conductive areas on the front surface, he controls the operation of the oven in which the window is installed. Since the details of the structure of the oven windows and the electroconductive circuits coupled thereto are not part of the present invention and the present invention is limited to the technique used to support the glass sheet during the application of the various frit-containing coatings thereto, particularly during the coating of the second side to be coated, the following description will be limited to the recital of materials and methods of applying the materials that form the various coatings of the oven window which are needed to perform an illustrative embodiment of the method of the present invention.

The first coating to be applied is a temporary resist consisting essentially of fine alumina particles dispersed in a binder that covers the entire rear surface and a pattern of area on the front surface of a glass sheet that serves as a ceramic substrate. A typical resist composition is description described U.S. Pat. No. 2,559,969 to Kennedy and contains a feldspar containing 60 to 77 parts by weight of $SiO_2$, 13 to 23 parts by weight of $Al_2O_3$, 8 to 18 parts by weight of alkali metal oxide and 0.5 to 0.8 parts by weight of an alkali metal borate such as $Na_2B_4O_7$ dispersed as a powder in a liquid medium containing a solution of one or more wetting agents, such as di-octyl sodium sulfo-succinate, an alkyl naphthalene sulfonic acid, or a sulfonated bicarboxy acid ester. The resulting composition is applied to glass to form a refractory chalk-like coating, inert chemically with respect to glass, and is readily removed by rubbing or washing with water. An acceptable resist composition is available commercially as DRAKENFELD No. 20-1278 resist, and consists essentially of pulverized aluminum oxide dispersed in a mixture of DRAKENFELD No. 900 oil (a mixture of pine oil and resin that hardens when dried) and an antiflowing agent sold under the trademark of DRAKENFELD No. 1359 medium. DRAKENFELD is a division of Hercules, Inc.

The composition is applied at room temperature over the entire back surface of each glass sheet to be used as a substrate. Later, it is also applied at room temperature through a stencil to desired areas of the front surface of the sheet after the aluminum oxide resist has hardened sufficiently on the back surface to enable the coated surface to be supported on a solid support. The resist composition dries in air and provides a mask for the glass sheet substrate during the later application of areas of electroconductive tin oxide. Hence, it is immaterial which side is coated first with the resist. As an alternative, the substrate may be supported vertically or near vertically and the resist applied to both surfaces and permitted to dry, thus masking those surface areas which are desired to be free of any conductive tin oxide coating.

The glass sheet with the mask thereon is supported on an expanded metal tray or other solid support and the tray or support with the coated glass sheet thereon is inserted into a furnace and heated to an elevated temperature range of approximately 1100°F. to 1300°F. with its surface completely covered resting on the tray and the partially coated surface facing upward. When the glass sheet reaches a desired temperature within said elevated temperature range, the front surface facing upward is contacted with a tin oxide film forming composition containing a tin compound or salt that, on contacting heated glass, yields a tin oxide film of uniform thickness having excellent adherence to the glass base upon which it is deposited.

The tin containing composition which is used is one capable of being readily dissolved or dispersed uniformly in a solvent or vehicle which is capable of maintaining the tin composition dissolved or dispersed uniformly therein during contact of the tin compound with the heated glass base. Organic tin components come closest to meeting the desired requisites. However, certain organic tin compounds may also be used to form the desired tin oxide films provided care is taken to avoid additional reactions of inorganic tin compounds that take place on the glass surface which forms a haze rendering the tin oxide coated article less desirable aesthetically. When inorganic tin compounds are used, it is usually necessary to treat the glass base prior to the application of the tin compound with a treatment such as dealkalization of the glass base and/or deposition of a protective film that serves as an alkali barrier prior to depositing the coating composition containing an inorganic tin salt or compound.

Organic tin compounds are preferred for the tin component of the compositions used to fabricate tin oxide coatings. Suitable organic tin oxide components capable of producing acceptable, thin transparent tin oxide films include: dibutyl tin oxide, stannous octylates, such as stannous 2-ethyl hexanoate, stannous isooctylate, tributyl tin oxide, dibutyl tin diacetate, tin butyl dilaurate, tributyl tin acetate, dibutyl tin maleate, dibutyl tin di-2-ethyl hexanoate, monobutyl tin tri-2-ethyl hexanoate, tributyl tin mono-2-ethyl hexanoate, stannous acetate, stannous-n-propylate, dibutyl tin dilaurate, tin acetylacetonate, etc. While the above organic tin oxide components have been listed by way of example, it should be realized that other tin containing, organic tin compounds that yield tin oxide films can be used which satisfy the previously defined requisites for use as a tin oxide forming compound.

The preferred organic tin compound having a tin oxide film forming composition is dibutyl tin oxide, the latter produces tenaciously adherent thin tin oxide film of uniform thickness and also has a high weight concentration of tin to allow the deposition of a desired thin tin oxide film at a very rapid rate.

EXAMPLE I

A typically suitable composition that yields acceptable tin oxide containing coatings is prepared by mixing 100 grams of dibutyl tin oxide with 40 grams of ammonium acetate, 55 grams of 20% HF in 3A alcohol (5 gallons of methyl alcohol mixed with 100 gallons of 95% pure ethyl alcohol) and 55 grams of N-propyl alcohol. This composition was dispensed onto a heated glass surface from a spray gun using an air pressure of 27 – 30 pounds per square inch gauge. Further details of applying a tin oxide film are described in U.S. Pat. No. 3,107,177 to Saunders and Wagner and in U.S. Pat. No. 3,411,934 to Englehart and Michelotti.

The glass sheets are conveyed through a tunnel-type furnace and leave the furnace at a temperature in the range of 1200° to 1240°F. The composition is applied to the upper surface in those regions free of resist at 3 cubic centimeters per second. A film having a surface resistivity of 300 ohms per square or less results in each of the uncoated areas when the composition is applied at 223 grams of said composition per square foot of substrate.

Figure 2:
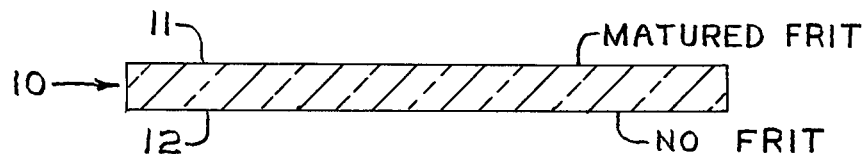

After the tin oxide film has been formed on the front surface of the glass sheet in a pattern of spaced areas, the coated glass sheet is cooled and the aluminum oxide resist is removed by washing. Various glass frits are then applied, first to one surface, then to the other surface, in the manner recited later. While it is immaterial which side is coated first when the present invention is used, it is advantageous to coat the substrate 10 so that one or more frit coatings are applied first only to one surface 11 having less total frit coating as shown in FIG. 1 and then the frit coating on surface 11 is matured as shown in FIG. 2 before any frit is applied to the opposite surface 12 by subjecting the substrate 10 to a temperature cycle that first heats the applied frit to soften the latter and then cools the frit to harden it and firmly bond it to the surface of the substrate.

Figure 3:
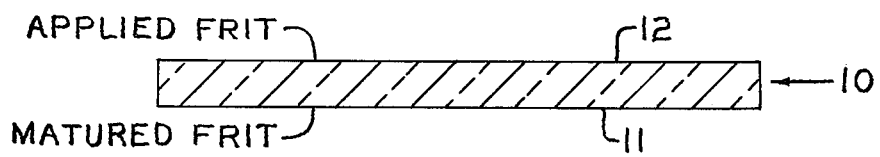
Figure 4:
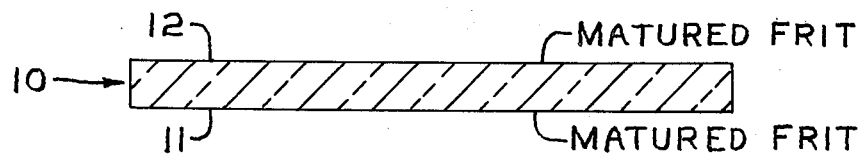

The glass sheet is then oriented with the surface 12 opposite the first surface 11 to have the frit coating applied and matured thereon facing downward on a solid support and a series of glassy frits are applied to the second surface 12 (which is the upwardly facing surface) as depicted in FIG. 3. The substrate so oriented is subjected to a second temperature cycle for maturing the frit coating on the surface 12 without spoiling the matured frit coating on surface 11. The frits that are applied are lead boro-silicate frits containing small proportions of coloring pigments, usually ranging from about 5 to 20 parts by weight.

A higher temperature is needed to temper a glass substrate than to mature a pulverulent frit and fuse it onto the glass substrate. If it is desired to impart a temper to the substrate, the temper is preferably imparted during the time of the second frit maturing step onto surface 12. Therefore, the highest temperature of the second temperature cycle is higher than that needed to mature the frit, so that the second temperature cycle includes a higher temperature than the highest temperature of the first temperature cycle.

When enamel frits are to be applied to glass sheets and the coating is to be fused or matured, the frits are generally first applied in a conventional way to the glass sheet in a suspension form, i.e., at normal atmospheric temperature, for example, in a volatile vehicle wherein at least part of the frit materials is suspended in the volatile vehicle. The suspension generally contains water, alcohol, a thickening agent, e.g., diethylene glycol, a suspension agent, e.g., sodium nitrite, and a dispersion agent, e.g., sodium pyrophosphate. Minor amounts of a foam reducing surface action agent, e.g., octyl alcohol, can also be added. A viscosity improving agent such as a viscosity reducing agent, e.g., citric acid, can likewise be added to reduce the viscosity of the frit composition and prevent the enamel from developing pinholes or void spaces in the coating. On the other hand, a viscosity increasing agent, e.g., methyl cellulose, can be added to the frit to increase the viscosity of the liquid vehicle should this be necessary. Typical suspensions containing solids dispersed in a liquid vehicle which can be employed for coating glass sheets while the glass sheets are supported on an inert fluid film and heated to a thermal deformation temperature in accordance with the procedure of the instant invention are shown in Table I:

TABLE I

| Ingredients | Parts I | | II | | Permitted Range |
|---|---|---|---|---|---|
| Water | 70 | cc | 70 | cc | 30–70 cc. |
| Methyl alcohol | 30 | cc | 28 | cc | 70–27 cc. |
| Diethylene glycol | 1 | cc | 2.5 | cc | 2%–10% by volume of alcohol |
| Sodium nitrite | 0.2 | g | 0.1 | g | 0.09%–0.12% of solids by weight |
| Sodium pyrophosphate | 0.1 | g | 0.1 | g | 0.05%–0.11% of solids by weight |
| Solids (coloring frits) | 200 | g | 130 | g | 130–250 g. |

A typical composition used to apply a pattern of colored frit by screen printing contains about 20 percent by weight of a mixture of pine oil (12.5 parts by weight) and turpentine (7.5 parts by weight) and 80 percent by weight of the mixture of pulverulent lead boro-silicate frit and coloring ingredients.

Various well known enamels (coloring frits) are dispersed within a selected one of the above vehicles by ball milling to a particule size of less than about 200 mesh and introducing the particles into the liquid vehicle. Typical frits used for various colors follow in TABLE II:

TABLE II

| Color | Ingredients | Parts by Weight |
|---|---|---|
| A. Medium Blue | Harshaw K886 White | 17.5 |
| | L755 Blue | 57.5 |
| | K733 Blue-Green | 25.0 |
| B. Brick Red | Vitro 7550E White | 33.0 |
| | 7410H Brown | 12.0 |
| | 7226A Red | 48.0 |
| | 7152B Orange | 7.0 |
| C. Peacock Green | Vitro 7550E White | 19.8 |
| | 7353C Green | 31.0 |
| | 7105D Yellow | 44.0 |
| | 7496B Black | 5.2 |
| D. Smoke | Vitro 7550E White | 94.0 |
| | 7410H Brown | 5.0 |
| | 7353C Green | 1.0 |
| E. Orange | Harshaw XR966 Red | 23.3 |
| | K886 White | 69.8 |
| | XR253 Brown | 6.9 |

These frits are enamel-forming compositions having analyses shown in TABLE III:

The chemical analysis of the ingredients recited above was determined by wet chemical analysis and absorption spectrophotometric analysis supplemented by qualitative emission spectrographic analysis. In the table of ingredients listed above, T indicates a trace, ND indicates not detected, and — indicates not determined.

Other colored frits are available commercially from the DRAKENFELD division of Hercules, Inc. and are identified as follows in TABLE IV:

TABLE IV

| COLOR | MAJOR COMPONENTS | DRAKENFELD STOCK NUMBER |
|---|---|---|
| Black | Cobalt, chromium | 29-2048 |
| Blue | Cobalt, chromium, aluminum | 27-559 |
| White | Titanium | 20-985 |
| Brown | Chromium, Iron | 29-2063 |
| Light Brown | Chromium, iron, titanium | 29-2033 |

The various coloring ingredients may be obtained by suitable mixtures of compounds of the metals such as oxides, sulfates, sulfides, chlorides, fluorides, chromates, hydrates, silicates, carbonates and the like.

In all of the colored frits enumerated above, the major ingredient (80 to 95 percent by weight of pulverized solids) is a lead-boro-silica glass consisting essentially of a composition within the following range of ingredients:

| | |
|---|---|
| PbO | 55 – 65 parts by weight |
| $SiO_2$ | 15 – 25 parts by weight |
| $B_2O_3$ | 2 – 5 parts by weight |
| $ZrO_2$ | 0 – 6 parts by weight |
| $Na_2O$ | 5 – 15 parts by weight |

TABLE III

FRIT COMPOSITIONS (PARTS BY WEIGHT)

| Ingredients | HARSHAW | | | | | | | | VITRO | | | |
|---|---|---|---|---|---|---|---|---|---|---|---|---|
| | K733 | K886 | L775 | XR253 | XR966 | 7105D | 7152B | 7226A | 7353C | 740H | 7496B | 7550E |
| $SiO_2$ | 28.17 | 22.73 | 27.16 | 26.57 | 27.36 | 18.50 | 25.42 | 25.56 | 22.64 | 23.40 | 26.80 | 25.98 |
| $Na_2O$ | 3.63 | 3.47 | 4.39 | 3.52 | 3.83 | 3.40 | 3.50 | 3.98 | 3.70 | 2.66 | 4.33 | 3.83 |
| $Al_2O_3$ | 1.77 | .29 | 8.34 | .84 | 1.06 | 5.94 | .87 | .63 | 4.37 | 1.12 | 3.16 | 1.00 |
| $ZrO_2$ | 3.05 | 3.50 | 2.52 | 4.46 | 2.45 | 1.91 | 1.67 | 2.35 | 2.30 | 1.96 | .04 | 2.70 |
| $Cr_2O_3$ | 4.59 | T | T | 2.74 | T | T | T | T | 15.45 | 9.22 | .25 | T |
| PbO | 45.66 | 48.13 | 44.69 | 44.58 | 45.90 | 53.46 | 42.44 | 46.37 | 39.51 | 36.42 | 46.19 | 46.18 |
| BaO | .50 | .45 | .93 | .92 | .79 | T | T | T | T | 3.40 | T | 3.29 |
| CdO | .20 | T | .32 | .27 | 6.53 | T | 12.02 | 5.44 | T | 5.04 | — | — |
| ZnO | 1.60 | .94 | .32 | 2.80 | T | 2.58 | — | — | .14 | 3.26 | 4.67 | 4.67 |
| $B_2O_3$ | 4.16 | 7.57 | 2.25 | 62.7 | 4.64 | 4.91 | 4.64 | 4.64 | 2.49 | .10 | 3.95 | T |
| MnO | T | T | — | — | T | T | T | .05 | .04 | .11 | 8.96 | 3.49 | .03 |
| $Fe_2O_3$ | .03 | .01 | .03 | 2.86 | .03 | .03 | .03 | .04 | .11 | 8.96 | 3.49 | .03 |
| $TiO_2$ | 3.06 | 13.00 | 1.53 | 1.66 | 1.74 | 4.08 | 2.53 | 2.63 | 2.63 | 2.10 | 2.66 | 11.65 |
| CoO | 1.13 | ND | 5.00 | — | ND | ND | ND | ND | 3.20 | T | 2.68 | ND |
| $Sb_2O_5$ | ND | ND | ND | T | T | 4.55 | — | — | T | ND | ND | ND |
| $Cu_2O$ | T | T | T | .27 | T | T | T | T | — | — | T | .03 |
| $Bi_2O_3$ | T | T | T | T | .04 | T | T | T | T | T | .04 | .03 |
| CaO | T | T | T | T | T | .02 | T | T | 1.67 | T | .10 | T |
| MgO | T | T | T | T | T | .04 | T | T | T | — | .22 | ND |
| NiO | T | ND | T | T | T | ND | T | T | T | T | ND | ND |
| $Li_2O$ | ND | ND | T | ND | ND | ND | ND | ND | ND | T | ND | ND |

-continued

| | |
|---|---|
| CdO | 0 – 5 parts by weight |

Each glass sheet surface is then covered in turn with a plurality of patterns of coating compositions, each comprising a glass frit containing coloring ingredients or other additives imparting different characteristics in an organic binder. Each coating composition to cover a given surface is applied as a dispersion of finely divided lead-boro-silica glass containing the desired coloring mixture in a dispersion containing pine oil or other volatile vehicle at room temperature and its volatile vehicle evaporated at a temperature between room temperature and a temperature at which the frit is prone to damage on contact with solid means before the next coating composition is applied. Evaporation can take place in 24 hours at room temperature. However, the volatile vehicle is evaporated in a matter of minutes by introducing the substrate in an oven with the newly applied frit facing up and exposing the coated substrate to a temperature range between 300° to 400°F. After a pattern of colored frit has been dried in this manner, it remains as a semi-permanent coating which is not affected by contact with a screen printing apparatus at room temperature, although the coating is susceptible to damage on abrasive contact with solid means at room temperature.

When all the frit coatings have been applied to the one surface, it is ready for maturing.

Maturing requires an elevated temperature of over 750°F. However, higher temperatures may be used to fuse the frits to the glass surface. It is understood that the frits are prone to damage on contact with solid means at temperatures below those at which they mature.

The printing and removing of the volatile vehicle steps are repeated for as many different coatings as desired, care being taken to remove the volatile vehicle between successive applications of coating composition to the upper surface.

In the so-called "touch panels", one side of the glass sheet is successively coated with a border of a brown colored frit (such as DRAKENFELD 29-2063), white lettering (using DRAKENFELD 20-985) and three blue dots (using DRAKENFELD 27-559) on the surface previously coated with spaced areas of tin oxide and the opposite surface contains an outer pattern of ceramic silver superimposed on an opaque coating, which in turn, is superimposed over a series of colored frit patterns including a brown coating (DRAKENFELD No. 29-2063), a light brown coating (DRAKENFELD No. 29-2033) and a black coating (DRAKENFELD No. 29-2048). It is noted in passing that one of the component frits (DRAKENFELD 29-2063) is applied to both major surfaces of the substrate.

A brown frit is applied to the opposite surface in alignment with each tin oxide coated area, a black frit is applied to a portion of the latter surface and a light brown frit applied to the entire latter surface. After the three colored frit compositions are applied and dried in turn, a dispersion of aluminum powder in a volatile vehicle, superimposed over the semi-permanent pattern of colored coatings including the remainder of the upper surface, is applied to opacify the upper surface. The aluminum powder may be applied as flaked particles dispersed in squeegee oil. A typical composition suitable for producing an opaque alumina coating after application and firing contains 5 to 15% by weight of aluminum flake mixed with 95 to 85% by weight of a finely divided glassy frit ground and dispersed in an appropriate squeegee vehicle such as DRAKENFELD No. 662 pine oil or other volatile additive used for the frit compositions mentioned previously.

The volatile ingredients of the last composition are evaporated using the same technique as employed with the DRAKENFELD frit compositions.

With the aluminum composition freed of its volatile vehicle, a ceramic silver frit is applied in a pattern through a screen printing apparatus to the upper surface of the opaque coating of aluminum oxide. The ceramic silver frit pattern is in the form desired for an electroconductive circuit on the surface opposite the surface coated with spaced tin oxide areas. A typical composition for the ceramic silver coating is the following:

| Ingredient | Parts by Weight |
|---|---|
| Finely Divided Silver | 70.0 |
| PbO | 7.5 |
| $SiO_2$ | 1.5 |
| $B_2O_3$ | 1.0 |
| Pine Oil | 12.5 |
| Turpentine | 7.5 |

A glass sheet tempering apparatus that was used to mature the glass frit compositions on the opposite surfaces comprises a loading station at one end of a 66 foot long furnace comprising a 30 foot long preheat section and a 36 foot long heating section. A quenching station comprising three consecutive cooling sections having respective lengths of 20 inches, 4 feet and 5 feet is disposed beyond the furnace. A conveyor providing a glass sheet support plane extending horizontally lengthwise and at a slope of 5° to the horizontal transverse to the length of the conveyor comprises a series of parallel conveyor rolls of 3 inch diameter set at 7½ inch center to center spacing in the loading station and the preheat section. Each conveyor roll is provided with a flange. The flanges form a line parallel to the length of the conveyor and engage an edge of a series of glass sheets to align the latter as they move along the conveyor. Electrical heating elements (referred to as top and bottom electrical preheat) are disposed above and below the first 5 feet of the preheat section, while recirculating gas convection heaters are disposed about 1 inch above and 1 inch below the plane of support for the glass sheets through the remaining 25 feet of the length of the preheat section. The top burner is referred to as Burner No. 1 and the bottom burner as Burner No. 2.

In the heating section of the furnace, there are six gas plenum blocks of equal length having apertured upper walls disposed at a 5° angle to the horizontal below the plane of support of the conveyor and provided with plenum chambers for supplying hot gas through a mosaic of openings comprising alternating rows of gas supply holes one-eighth inch in diameter spaced at ¾ inch centers from rows of exhaust openings 7/32 inch in diameter spaced at ¾ inch centers to form a gas bed of rows ¾ inch apart with the openings in adjacent rows offset ⅛ inch transverse to the axis of glass sheet travel for supporting glass sheets in spaced relation to the upper walls of the plenum blocks. Above the first two plenum blocks, there is a burner 12 feet long (referred to as Burner No. 3) similar in structure to the preheat section burners. Above the remaining four plenum blocks are located three sections of electrical heaters 6 feet, 12 feet and 6 feet long, respectively. Each electrical heater is divided into left, center and right sections to provide localized control for electrical input.

The quenching station is provided with three independently fed arrays of modules both above and below the conveyor and having glass facing surfaces inclined at an angle of 5° to the horizontal transversely of the length of the conveyor. In the portion of the conveyor extending through the heating section and the quenching station, the glass sheets are supported on a bed of gas and are engaged along their lower edges by a series of driving discs 7½ inches in diameter spaced on 8 inch centers, which discs are disposed in the plane of support of the glass in alignment with the series of glass edge engaging flanges on the conveyor rolls of the loading and preheat sections.

Beyond the quenching station, the conveyor continues with conveyor rolls similar to those in the loading station and preheat section to a cooling zone, an unloading station, an inspection station and a packing station such as is well known in the art. The details of the tempering apparatus are not part of the present invention, but are recited to acquaint one skilled in the art with a specific embodiment used to mature a pattern of frit coatings on one surface of a series of glass sheets without spoiling the frit coating previously matured on the other surface.

In maturing the frit on the first coated side with the opposite side free of any frit, glass sheets 7 inches by 29 inches by 3/15 inch were mounted as in FIG. 1 with their first major surfaces 11 coated with dried frit compositions facing upward and their second major surfaces 12 free from frit facing downward at a spacing of 8 inches between adjacent sheets. The electric power was off in the first 5 feet of length of the preheat section, but Burner No. 1 was provided with an effective temperature of 1220°F. at the burner surface while Burner No. 2 was provided with an effective temperature of 1400°F. The glass sheets passed through the furnace at a line speed of 260 inches per minute. In the heating section, upper Burner No. 3 was provided with an effective temperature of 1170°F. and all the electrical heaters were set for a radiant temperature of 1200°F. The six gas plenums below the gas bed in this section were set to provide gas at effective, consecutive temperatures of 1200°F., 1240°F., 1200°F., 1220°F., 1220°F., and 1240°F., respectively at respective pressures of 3, 3, 3, 3, 3, and 1¾ inches of water column. The pressure in the plenums of the quench sections was 11, 12 and 3 ounces per square inch for the top plenums and 9 ounces per square inch in all the lower plenums in the respective quench sections. The frit coatings, which softened while the coated glass sheets passed through the heating section, hardened and fused to the glass sheets as the latter passed through the quench sections, thus maturing the frit onto the surface 11.

After the described program of heating and cooling, the frit coatings on the upper surface 11 were matured as depicted in FIG. 2. Then, the second surfaces 12 were coated with the other set of frit coatings and the coatings dried as previously described for the pretreatment for the frit coatings on the first surface 11.

The apparatus described above was adjusted slightly differently to mature the frit compositions on the second surface with the frit matured onto the first surface facing down. The glass sheets were conveyed through the apparatus for the second time in the orientation depicted in FIG. 3, which is an upside down relation to their orientation during the first conveyance. The previous maturing of the frit applied to the surface 11 now oriented to be the lower surface made the lower surface of the frit-coated glass sheets less susceptible to damage on contact with solid supporting means at even higher temperatures than previously, and made the previously matured frit especially resistant to said damage at the lower temperatures of the range of temperature treatments to which the glass sheets are subjected during the second maturing.

The substrates, with the matured coating facing downward and the newly dried frit compositions oriented to face upward, were again fed through the apparatus at a line speed of 260 inches per minute with the bottom surfaces containing the matured frit coatings passing over a series of conveyor rolls in the 30 foot long preheat section while exposed to the upper and lower electrical heaters radiating heat at 1400°F. from both above and from below the path of glass travel and then were conveyed at said speed beneath upper Burner No. 1 set to provide an effective temperature of 1340°F. and above lower Burner No. 2 set to provide an effective temperature of 1220°F. In the 36 foot long heating section traversed by the glass sheets, top Burner No. 3 was set to provide an effective temperature of 1170°F. and all of the upper electrical heaters radiated heat downward at an effective temperature of 1200°F. while the gas was supplied through the gas plenums to provide the gas support bed at consecutive effective temperatures approximately 1200°F., 1240°F., 1200°F., 1220°F., 1220°F. and 1240°F. at plenum pressures of 3, 3, 3, 3, 3, and 1¾ inches of water column, respectively. In the quenching zones which the sheets traversed upon leaving the furnace, the plenums for the upper quenching modules were pressurized at 5, 12 and 3 ounces per square inch, respectively, while the plenums for the lower quenching modules were simultaneously pressurized at 8, 9 and 9 ounces per square inch, respectively.

Since the electrical preheat was off during the maturing of the frit on the first surface 11 and energized during the maturing of the frit on the second surface 12, the glass substrates attained a higher temperature during the second frit maturing step than during the first maturing step. Also, the cooling of the heated glass sheets was performed rapidly enough in the quenching zones during the maturing of the frit onto the second major surface to impart at least a partial temper to the glass sheets.

The following results were obtained in early production runs of "touch panels" using the apparatus and controls described in the aforesaid examples. Of 65 samples run in one test, 65 passed the inspection requirements for suitability for shipment to the customer. In a latter production run of similar parts, 86 parts out of 90 parts processed passed inspection for shipment to the customer and were shipped.

The glassy bases for the colored frits applied to the opposite glass surfaces were such that there was no significant difference in the maturing temperatures of the frit compositions applied to the opposite surfaces. However, it is unnecessary to apply frit compositions having higher maturing temperatures to one surface and frit compositions having lower maturing temperatures to the other surface as long as the present invention is followed. In following this invention, whenever the second surface to be coated is coated with a composition whose maturing temperature is not significantly different from the maturing temperature or that at which the matured coating composition on the first surface to be coated is prone to damage on contact with solid support means, it becomes necessary to float the substrate with its previously coated surface supported on gas out of contact with solid support means at least during the elevated temperature portion of the thermal treatment cycle needed to mature the frit on the second surface. The matured coating may be supported on gas support means rather than solid support means for the entire temperature cycle, if desired. However, a gas support is not essential at lower temperatures of the frit maturing cycle substantially below the maturing temperature of the previously matured frit. Hence, the illustrative embodiment of the present invention uses conveyor rolls to engage a surface coated with a matured frit during the lower temperature portion of the thermal treatment cycle only and supports the substrate to be coated with its surface already coated with a matured frit on gas during the portion of the temperature treatment cycle when the likelihood of damage to the matured coating on the opposite surface due to contact with a solid member becomes significant.

It is understood that the use of a gas support during the upper temperature portion of the temperature cycle for maturing the glassy frit on the upper surface allows the previously matured coating on the lower surface to remain free of defects that are prone to develop should the lower surface engage solid support means at these elevated temperatures. Even when the frits coating the opposite surfaces have approximately equal maturing temperatures, the use of a gas support bed rather than solid support means for the surface containing the previously matured frit composition at least during the portion of the temperature cycle where engagement with solid support means is prone to damage the matured frit not only avoids the engagement that damages the frit but also rematures the previously matured frit so that a frit coating that may have been inadequately matured during the first pass through the furnace leaving some rough spots may be better matured and more uniformly smooth after the second pass particularly when the substrate is heated to a higher temperature during the second pass to help impart a temper into the substrate while maturing the frit onto the second surface.

A satisfactory temper occurs when glass develops an edge compression stress of 10,000 pounds per square inch. The method described previously has accomplished this objective and typical edge compression stresses obtained are in the range of 13,000 to 14,000 pounds per square inch.

The screen printing process described previously represents one of several methods of applying a pattern of a frit on a substrate and many other techniques are possible. For example, a hot melt screening technique where the coating material is supported on an electrically heated stainless steel screen and forced through the screen onto a surface of the substrate by squeegee action is also contemplated. The coating material freezes immediately on contacting the relatively cold substrate surface when applied by this so-called hot melt screening technique. Of course, one or more coatings can be applied by spraying through openings in a mask and by any other well known techniques for applying a design.

The form of the invention described herein represents an illustrative embodiment thereof. It is understood that various changes may be made without departing from the spirit of the invention as defined in the claimed subject matter that follows.

We claim:

1. A method of coating both major surfaces of a ceramic substrate comprising coating a first major surface of said substrate with a ceramic frit and maturing said frit at a first elevated temperature with its second major surface free of said frit, said matured ceramic frit being prone to damage when contacted with a solid means at an elevated temperature approaching its maturing temperature, orienting said substrate so that its first major surface faces downward and said second major surface faces upward, applying ceramic frit to the second major surface of said substrate at a temperature below which said matured ceramic frit would be prone to said damage while said substrate is so oriented, subjecting said substrate to a thermal treatment that comprises heating said substrate while so oriented to a temperature above said first elevated temperature and cooling said substrate to below a temperature at which said frit hardens and fuses to said second major surface, and initiating the application of a bed of gas against said matured frit coating to support said substrate in said orientation on said gas bed with said matured frit coating spaced from solid means before the substrate reaches a temperature at which said matured frit is prone to said damage on contacting solid means during said heating and continuing to support said substrate on said gas bed during said thermal treatment at least as long as the substrate is at a temperature at or above which said matured ceramic frit is prone to said damage on contacting solid means.

2. A method as in claim 1, wherein said substrate is supported on solid support means while at a temperature below that at which said matured frit is subject to said damage while applying said ceramic frit to said second major surface.

3. A method as in claim 1, wherein said substrate is heated to an elevated temperature above that needed to mature said frit and sufficient to impart a temper to said substrate while supporting said substrate in said orientation on said gas bed and then is cooled sufficiently rapidly from said elevated temperature to impart at least a partial temper to said substrate.

4. A method as in claim 1, wherein said composition containing a ceramic frit is initially applied to said second major surface while dispersed in a volatile vehicle.

5. A method as in claim 4, wherein said composition containing said frit dispersed in a volatile vehicle is applied to said second major surface of said substrate while the latter is so oriented, said volatile vehicle is evaporated at a temperature range between approximately room temperature and an elevated temperature below the temperature range at which the matured ceramic frit is prone to said damage on contact with solid means while supporting said substrate on solid means before said heating to said maturing temperature, leaving a semi-permanent frit coating facing upward on said second major surface, and said substrate is supported on said gas bed with said matured frit coating out of contact with any solid means when said temperature is increased above said temperature range during said thermal treatment to mature said frit applied to said second major surface.

6. A method as in claim 5, wherein said frit composition dispersed in a volatile vehicle is applied in a first pattern to said second major surface of said substrate while the latter is so oriented, said volatile vehicle is evaporated within said temperature range leaving a first pattern of semi-permanent frit coating facing upward on said second major surface, another frit composition disposed in a volatile vehicle is applied in a second pattern to said second major surface of said substrate while the latter is so oriented, said volatile vehicle of said another frit composition is evaporated at said temperature range, and said application and evaporation steps are repeated for as many different frit compositions as desired to deposit a plurality of patterns of semi-permanent frit compositions facing upward on said second major surface with a matured frit coating on said first major surface of said substrate, and said substrate so coated is then subjected to a thermal treatment including heating said substrate so coated and so oriented to an elevated temperature sufficient to mature said frit composition while supporting said substrate with its previously matured composition on a gas bed out of contact with solid means.

7. A method as in claim 1, wherein frit is applied in a first pattern to said first major surface and in a second pattern different from said first pattern to said second major surface.

8. An article of manufacture resulting from the method of claim 1.

9. A method of coating both major surfaces of a glass sheet with frit compositions having no significant difference in maturing temperature from surface to surface, which frit compositions are prone to damage on contacting solid means at an elevated temperature range below the maturing temperature for said frit compositions comprising applying a first frit composition to a first major surface of said glass sheet with its second major surface free of said frit, heating said glass sheet to a first elevated temperature above said temperature range and sufficient to soften the frit in said first frit composition onto said first major surface, cooling said glass sheet to harden said frit and form a matured frit coating on said first major surface, orienting said glass sheet with its matured coating facing downward, applying a frit composition having a maturing temperature that does not differ significantly from the maturing temperature of said first frit composition to a second major surface opposite the first major surface, heating said glass sheet to a higher temperature sufficient to impart a temper onto said glass sheet and above that necessary to soften the frit composition applied to said second major surface and cooling said glass sheet to harden said frit and form a matured frit coating on said second major surface while supporting said glass sheet with its matured frit coating on said first major surface on gas in spaced relation to solid support means at least during the portion of said heating and cooling steps performed with said matured coating facing downward when the temperature of said coating is sufficient to make it prone to damage on contact with solid support means, said cooling being accomplished sufficiently rapidly to impart at least a partial temper to said glass sheet.

10. A method as in claim 9, wherein more than one frit composition is applied to at least one of said major surfaces before the sheet is heated and cooled to form a matured frit coating on said surface comprising applying said frit compositions at room temperature in the form of a dispersion in a volatile vehicle wherein said volatile vehicle for each frit composition is removed by heating below the temperature needed for maturing thereby rendering the frit composition capable of resisting damage on contacting screen printing apparatus at temperatures approximating room temperature before applying another of said frit compositions to said surface.

11. A method as in claim 9, wherein said glass sheet is cooled sufficiently rapidly to impart an edge compression stress of more than 10,000 pounds per square inch, thereby tempering said sheet.

12. An article of manufacture resulting from the method of claim 9.

* * * * *

UNITED STATES PATENT OFFICE
CERTIFICATE OF CORRECTION

PATENT NO. : 3,961,120
DATED : June 1, 1976
INVENTOR(S) : Ralph E. Hearn and Clarence McMillen It is certified that error appears in the above-identified patent and that said Letters Patent are hereby corrected as shown below:

In the Abstract, line 14, "demaging" should be --damaging--.

Column 5, line 12, "organic" should be --inorganic--.

Column 11, line 32, "3/15" should be --3/16--.

Column 12, line 58, "latter" should be --later--.

Signed and Sealed this

Twenty-fourth Day of August 1976

[SEAL]

Attest:

RUTH C. MASON
Attesting Officer

C. MARSHALL DANN
Commissioner of Patents and Trademarks